E. ROBERTS & A. H. GIBSON.
CENTRIFUGAL MACHINE.
APPLICATION FILED JAN. 31, 1908.
957,715.
Patented May 10, 1910.
2 SHEETS—SHEET 2.
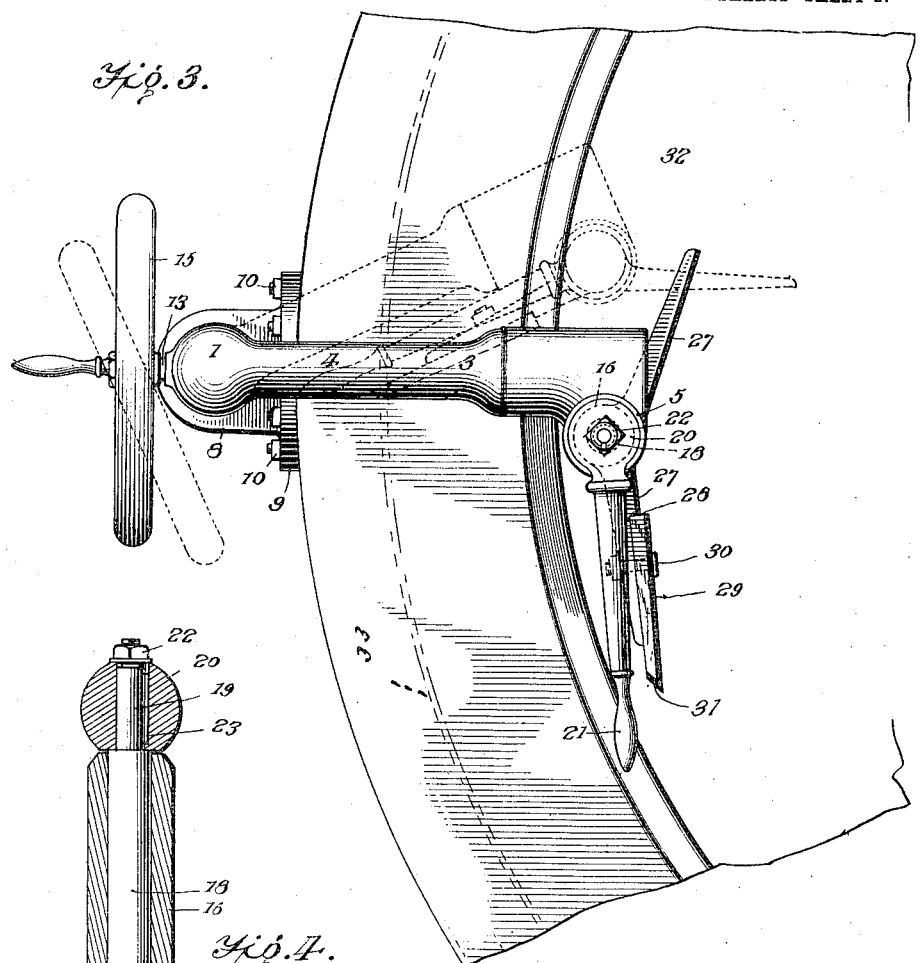
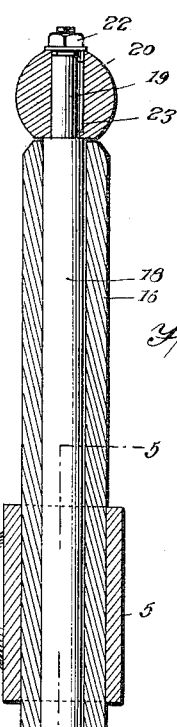
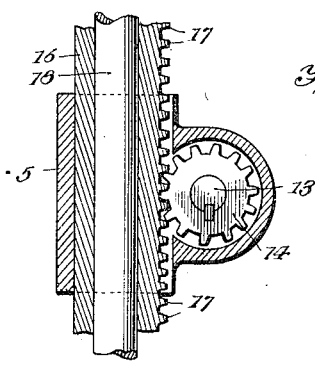
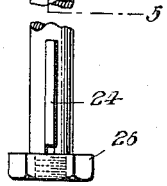
WITNESSES
J. H. Schmidt.
C. E. Trenor
INVENTORS
EUGENE ROBERTS,
ANGUS H. GIBSON,
BY Munn & Co.
ATTORNEYS

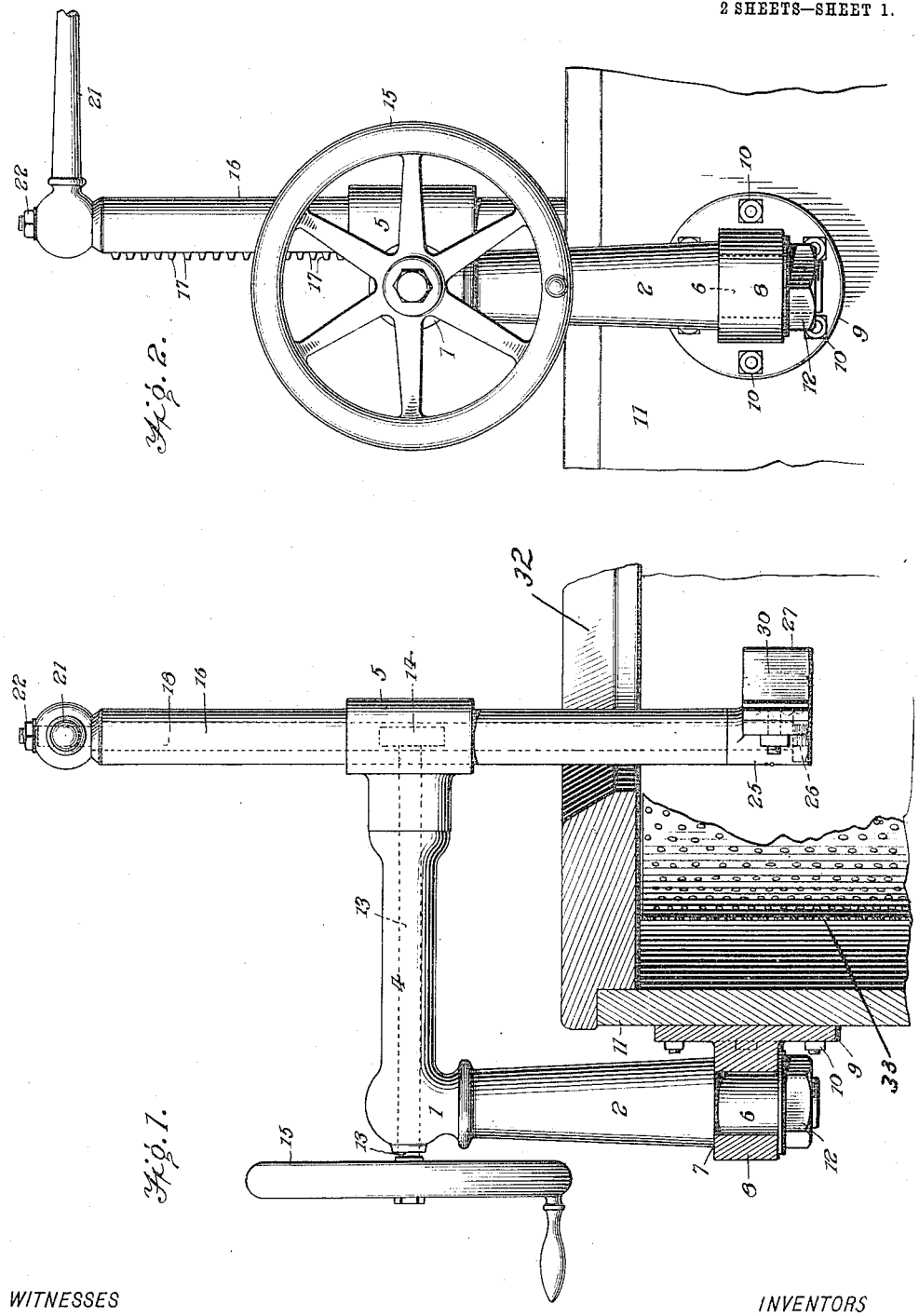

UNITED STATES PATENT OFFICE.

EUGENE ROBERTS AND ANGUS H. GIBSON, OF LEHI, UTAH.

CENTRIFUGAL MACHINE.

957,715.   Specification of Letters Patent.   Patented May 10, 1910.

Application filed January 31, 1908. Serial No. 413,500.

*To all whom it may concern:*

Be it known that we, EUGENE ROBERTS and ANGUS H. GIBSON, citizens of the United States, and residents of Lehi, in the county of Utah and State of Utah, have made certain new and useful Improvements in Centrifugal Machines, of which the following is a specification.

Our invention is an improvement in centrifugal machines, and consists in certain novel constructions and combinations of parts hereinafter described and claimed.

Referring to the drawings forming a part hereof—Figure 1 is a section through the casing of a centrifugal machine provided with our improvement. Fig. 2 is a side view of the improvement. Fig. 3 is a plan view. Fig. 4 is a vertical section through the hollow shaft, and Fig. 5 is a section on the line 5—5 of Fig. 4.

The present embodiment of our invention, is supported by a bracket 1, comprising a vertical portion 2, and a horizontal portion 3, the horizontal portion being provided with a longitudinal bearing 4, having at the inner end thereof a vertical sleeve 5. The vertical portion of the bracket 2, has its lower end reduced as at 6, a shoulder 7 being arranged between the reduced portion and the main portion, and the reduced portion is received in a bearing 8, which is provided with a base 9 secured by bolts 10, to the side of the casing 11. A nut 12 is threaded on to the lower end of the reduced portion of the bracket, for securing the bracket in place.

A shaft 13 is journaled in the horizontal bearing, the end of the shaft adjacent to the sleeve 5 being provided with a pinion 14, and the other end with a hand wheel 15 for convenience in manipulating the shaft. A hollow shaft 16 is slidable in the sleeve 5, and one side of the shaft is provided with rack teeth 17, with which the pinion 14 meshes.

A rod 18 is journaled in the hollow shaft, the upper end of the rod being reduced as at 19, and passing through an opening in a ball 20, which has projecting therefrom a lever 21. The lower side of the ball 20 rests on the top of the hollow shaft, and a nut 22 is threaded on to the upper end of the rod, whereby to retain the ball in place. A key 23 is provided on the reduced portion of the rod, the said key engaging a key-way in the ball as shown in Fig. 4, to constrain the rod to move with the lever 21.

The lower end of the rod 18, is provided with a key 24, engaging a key-way in a bearing 25, and the bearing is secured on the rod by a nut 26, as shown in Fig. 4. The bearing 25 is provided with arms 27, projecting in opposite directions from each other, and one of the arms is provided with a shoulder 28, against which abuts the inner end of a wooden paddle 29, secured to the arm by a bolt 30. The outer end of the wooden paddle 29 is beveled as at 31, so that when the arm is swung into the position shown in Fig. 3, the beveled end of the paddle will fit the side of the inner screen casing 33.

Our invention is especially adapted for use in centrifugal machines used in sugar making, and the operation is as follows; when it is desired to empty the sugar, the centrifugal machine is slowed up somewhat, and the hollow shaft being elevated, the bracket is swung so that the horizontal portion thereof projects over the casing. The hand wheel is now turned to lower the hollow shaft through the opening 32 in the top of the casing, after which the lever 21 is turned to bring the paddle into the position shown in Fig. 3 in dotted lines. During the lowering of the paddle into the casing, the said paddle occupies the position shown in full lines in the said figure. After the sugar is loosened, the lever is operated to swing the paddle into the position shown in Fig. 3, and the hand wheel is rotated to elevate the paddle from the casing, after which the bracket may be swung to the side of the casing entirely out of the way.

We claim—

1. The combination with the casing of the centrifugal machine, of a bearing secured thereto, a bracket comprising a vertical portion journaled in the bearing, and a horizontal portion having a horizontal bearing therethrough, and a vertical sleeve at the end thereof, a shaft journaled in the bearing, a pinion on the shaft adjacent to the sleeve, a hand wheel on the other end of the shaft, a hollow shaft slidable in the sleeve and provided with rack teeth engaged by the pinion, a rod journaled in the hollow shaft, a lever on the upper end of the rod for manipulating the same, an arm on the lower end of the rod, and a paddle secured to the arm.

2. The combination with the casing of the centrifugal machine, of a bracket supported thereon, a hollow sleeve slidable in the bracket, means for raising and lowering the sleeve, a rod journaled in the sleeve, a lever connected with the upper end of the rod for manipulating the same, an arm connected with the lower end of the sleeve, and a paddle secured to the arm.

3. The combination with the casing of the centrifugal machine, of a hollow sleeve, means for supporting the sleeve for swinging movement over and away from over the casing, means for moving the sleeve into and out of the casing, a rod journaled in the sleeve, a lever secured to the rod for oscillating the same, an arm secured to the lower end of the rod, and a paddle in connection with the arm.

4. The combination with the centrifugal machine, of a rod mounted above the machine, means for swinging the rod over and away from over the machine, means for raising and lowering the rod, a paddle arranged transversely of the lower end of the rod, said paddle having one end beveled for engaging the inner wall of the casing of the machine, and means for oscillating the rod.

5. The combination with the centrifugal machine, of a rod mounted above the machine, means for moving the rod over and away from over the machine, means for raising and lowering the rod, a paddle arranged transversely of the lower end of the rod, and means for oscillating the rod.

EUGENE ROBERTS.
ANGUS H. GIBSON.

Witnesses:
JOHN N. BUTT,
EDWARD SOUTHWICK.